United States Patent
McKinlay

(10) Patent No.: US 9,724,971 B2
(45) Date of Patent: Aug. 8, 2017

(54) BALANCER FOR A WHEEL AND TYRE ASSEMBLY

(71) Applicant: Bentley Motors Limited, Cheshire (GB)

(72) Inventor: Andrew James McKinlay, Cheshire (GB)

(73) Assignee: BENTLEY MOTORS LIMITED, Crewe, Cheshire (GB)

( * ) Notice: Subject to any disclaimer, the term of this patent is extended or adjusted under 35 U.S.C. 154(b) by 356 days.

(21) Appl. No.: 14/372,660

(22) PCT Filed: Jan. 18, 2013

(86) PCT No.: PCT/GB2013/050113
§ 371 (c)(1),
(2) Date: Jul. 16, 2014

(87) PCT Pub. No.: WO2013/108040
PCT Pub. Date: Jul. 25, 2013

(65) Prior Publication Data
US 2014/0360636 A1    Dec. 11, 2014

(30) Foreign Application Priority Data
Jan. 19, 2012  (GB) .................................. 1200883.5

(51) Int. Cl.
*B60C 5/00*     (2006.01)
*B60C 19/00*    (2006.01)
(Continued)

(52) U.S. Cl.
CPC .......... *B60C 19/003* (2013.01); *F16F 15/345* (2013.01); *F16F 15/363* (2013.01);
(Continued)

(58) Field of Classification Search
CPC ........... B60C 5/00; B60C 5/004; B60C 5/005; B60C 19/00; B60C 19/003
See application file for complete search history.

(56) References Cited

U.S. PATENT DOCUMENTS 2,695,047 A    11/1954  Ruck
3,256,123 A *   6/1966  Hart ....................... B29D 30/04
                                               152/317
(Continued)

FOREIGN PATENT DOCUMENTS

DE    19853691 A1    7/2000
EP    1321726    *    6/2003
(Continued)

OTHER PUBLICATIONS

UK Patent Office, UK Search Report, GB1200883.5.

*Primary Examiner* — Justin Fischer
(74) *Attorney, Agent, or Firm* — Barlow, Josephs & Holmes, Ltd.

(57) ABSTRACT

A balancer for a wheel and tire assembly includes one or more tubes 101 containing a movable mass 104. The tube or tubes is/are mounted to a resiliently deformable support 102 with an outer dimension that substantially matches an inner dimension of the tire. the support being arranged to position and support the or each tube within the tire. The/or each tube may be annular. The support may be formed from a plastics mesh 102.

21 Claims, 4 Drawing Sheets

(51) Int. Cl.
*F16F 15/36* (2006.01)
*F16F 15/34* (2006.01)

(52) U.S. Cl.
CPC ............ *F16F 15/366* (2013.01); *B60C 5/004* (2013.01); *F16F 2226/04* (2013.01); *Y10T 29/49492* (2015.01)

(56) References Cited

U.S. PATENT DOCUMENTS

| | | |
|---|---|---|
| 3,913,980 A | 10/1975 | Cobb |
| 4,269,451 A | 5/1981 | Narang |
| 5,142,936 A | 9/1992 | McGale |
| 5,728,243 A | 3/1998 | Heffernan |
| 2005/0012382 A1 | 1/2005 | Fogal |
| 2010/0213755 A1 | 8/2010 | Fogal |

FOREIGN PATENT DOCUMENTS

| | | | |
|---|---|---|---|
| GB | 854424 | | 11/1960 |
| JP | 3927308 | * | 6/2007 |
| JP | 2008-80970 | * | 4/2008 |
| WO | WO 2004/050392 | * | 6/2004 |
| WO | WO2011042549 A1 | | 4/2011 |

* cited by examiner

BALANCER FOR A WHEEL AND TYRE ASSEMBLY

TECHNICAL FIELD OF THE INVENTION

The present invention relates to a balancer for a wheel and tyre assembly. In particular, it relates to a balancer with a mass that has some freedom to move so as to dynamically balance the wheel and tyre assembly.

BACKGROUND TO THE INVENTION

Road vehicle wheel and pneumatic tyre assemblies are mounted to a vehicle for rotation about an axis, the axis typically being parallel to an axle on which wheel and tyre assembly is mounted. Since the wheel and tyre assembly is a solid body, its moment of inertia is a second rank tensor and unless the axis of rotation of the assembly is parallel to one or its principle axes of inertia rotation of the wheel will result in out of balance forces. This can cause the wheel to wobble and can also lead to excessive wear of certain parts of the vehicle, especially wheel bearings. If either of the front wheels of an automobile are out of balance they can cause the steering wheel of the vehicle to vibrate.

For this reason, wheel and tyre assemblies are balanced, to ensure that the mass of the wheel and tyre assembly is distributed evenly around axis of rotation of the assembly so that the axis of rotation of the wheel coincides with one of the principle axes of inertia of the assembly.

Typically, vehicle wheels are balanced by affixing balance weights to the inside of the wheel rim. After a tyre has been fitted to the wheel the resulting wheel and tyre assembly is rebalanced by affixing balance weights to the outside flange of the rim of the wheel in order to compensate for mass unevenly distributed in the tyre.

Other known methods of balancing a wheel and tyre assembly employ a mass that has some freedom to move so as to dynamically balance the assembly. U.S. Pat. No. 4,269,451 and US2007/0126279 disclose the use of one or more tubes which are at least partially filled with fluid and spherical masses and which extend around at least a part of the circumference of the wheel assembly. In use, as the wheel assembly rotates, centrifugal forces distribute the mass in the tube so as to balance the assembly.

In common with fixed weights, the tubes of US2007/0126279 are shown mounted to either the inside of the wheel rim, or to the outside flange of the wheel. A problem with affixing weights to the inside of a wheel rim is that they limit the amount of space remaining within the wheel rim in which to locate brakes. With increases in vehicle performance there is a need to increase the size of brake assemblies, particularly brake discs, which in outboard brake installations are usually located within the rim of the vehicle wheel.

The arrangement disclosed in U.S. Pat. No. 4,269,451 overcomes this problem by locating the moveable weights within the tyre. The arrangement where an annular tube is mounted in rings secured to the radially inner surface of the tread portion of the tyre is complex to install. Whilst it is disclosed that the tube may be supported in the tyre by way of a snug fit it is not explained how this would in practice be achieved and in any event is not recognised as a preferred approach since radial movement of the tube is then prevented.

It is an object of embodiments of the present invention to provide an improved, alternative balancer for a wheel and tyre assembly which at least partially overcomes or alleviates the above problems.

SUMMARY OF THE INVENTION

According to a first aspect of the present invention there is provided a balancer for a wheel and tyre assembly comprising: one or more tubes containing a movable mass, the or each tube being mounted to a resiliently deformable support with an outer dimension that substantially matches an inner dimension of the tyre, the support being arranged to position and support the or each tube within the tyre.

Such an arrangement allows for simple, easy installation. The support may be distorted by application of external forces in order to locate the balancer inside the tyre. Once inside the tyre and the external forces are removed, the support will return to its original form and, since the support has an outer dimension that substantially matches an inner dimension of the tyre, the balancer will be disposed proximate to the inner dimension of the tyre and located relative to the tyre by the support. This facilitates mounting of a tyre containing the balancer assembly to a wheel as well as ensuring that the mass is located in a desired position within the wheel and tyre assembly.

The movable mass may comprise a movable material, such as a liquid and/or plurality of discrete solid bodies. The discrete solid bodies may be substantially spherical and could be ball bearings. The or each tube may be only partially filled with material. The or each tube may extend around the entire circumference of the tyre and wheel assembly or just part of it. The or each tube may be annular. The or each tube may be resiliently deformable. The or each tube may have an outer dimension that substantially matches an inner dimension of the tyre.

In a preferred embodiment, the balancer comprises two annular tubes arranged to extend around the entire circumference of the tyre of a wheel and tyre assembly, each one of said annular tubes being proximate to a different inner side wall of the tyre. Such an arrangement allows for a better balanced assembly over single tube arrangements. In this embodiment the support may support the two tubes parallel and spaced apart from each other.

The support may be a single structure or it may comprise a plurality of structures.

The inner dimension of the tyre may be the inside radius of the circumferential wall of the tyre, that is to say the radially inner wall of the tread part of the tyre. The support may be generally cylindrical and the outer dimension of the support may be its outer radius. Preferably, the support is arranged to contact the inner side walls and/or the inner circumferential wall of a tyre. Where the support is arranged to contact the inner circumferential wall of a tyre it is preferably arranged to contact only a small fraction of the surface area of the circumferential wall of the tyre, for example less than 5% and preferably less than 1%, so as not to interfere with the operation of a liquid puncture repair. Preferably, the parts of the support that are arranged to contact the circumferential wall of the tyre are those to which the movable mass is mounted. The support may be arranged to lie between the inner circumferential wall of the tyre and the movable mass. The support preferably does not absorb liquids. The support may be formed from a substantially solid plastics material.

The support may be formed either separately from or integrally with the or each tube. For embodiments wherein the support and the or each tube are formed separately, any suitable mounting means may be employed. For example, the movable mass may be adhered, welded, clipped or otherwise fastened to the support.

The support may be of the form of a resiliently deformable mesh. The mesh may be formed from a plastics material. The support may form a ring. Where the support comprises a ring of mesh material free edges of the mesh on opposite sides of the ring may joined to a ring formed from a strip of material, such as plastics material, which may also be resiliently deformable. The outside circumferential surface of the ring may be concave so that the edges of the ring will contact the inner circumferential wall of a tyre in which the ring is placed. The support may be arranged, in use, to flex under the action of centrifugal force as the tyre in which it is installed rotates. It may be arranged so that as it rotates a greater proportion of the support comes into contact with the tyre when the tyre is rotated above a predetermined rate.

According to another aspect of the invention there is provided a tyre having a balancer mounted therein. The tyre may be mounted to a wheel. The wheel may be mounted to a vehicle, such as an automobile.

The balancer may additionally comprise a body of sound absorbing material. The body of sound absorbing material may be made from a foamed plastics material. Any other suitable acoustic damping material could be used. The body of sound absorbing material may be flexible and, in particular, may be resiliently flexible. The body of sound absorbing material may be generally annular in cross-section and may be generally toroidal in shape. The body of sound absorbing material may be arranged to expand to bear against the inside circumferential wall of a tyre in which it is fitted under the action of centrifugal force, deforming or absorbing the support, when the tyre is rotated above a predetermined rate. Apertures may extend through the body of sound absorbing material to allow a liquid puncture repair to flow through the body. Apertures may extend through the toroidal body. The body of sound absorbing material may be provided with a cover. The cover may be formed from a fabric.

The sound absorbing material is preferably arranged so that when fitted into the tyre of a wheel and tyre assembly it is spaced from the wheel.

The use of a mass with some freedom to move to balance a wheel and tyre assembly is particularly advantageous when combined with a body of sound absorbing material which may move relative to the tyre during use, such as under heavy braking. Any movement of the sound absorbing material relative to the tyre or wheel could alter the balance of the assembly, but any alteration will subsequently be corrected by a corresponding movement of the balancing mass.

According to another aspect of the present invention there is provided a method of installing a balancer for a wheel and tyre assembly of the type comprising one or more tubes containing a movable mass said method comprising the steps of: mounting the or each tube on a resiliently deformable support with an outer dimension that substantially matches an inner dimension of the tyre; deforming the support so that it can be located inside the tyre by application of suitable external forces; and removing said forces to allow said support to position and support the or each tube within the tyre.

This method is significantly easier than prior art methods and, since the support has an outer dimension that substantially matches an inner dimension of the tyre, the movable mass will be disposed proximate to the inner dimension of the tyre and held there by the support.

DETAILED DESCRIPTION OF THE INVENTION

In order that the invention may be more clearly understood embodiments thereof will now be described, by way of example only, with reference to the accompanying drawings, of which:

Figure 1:
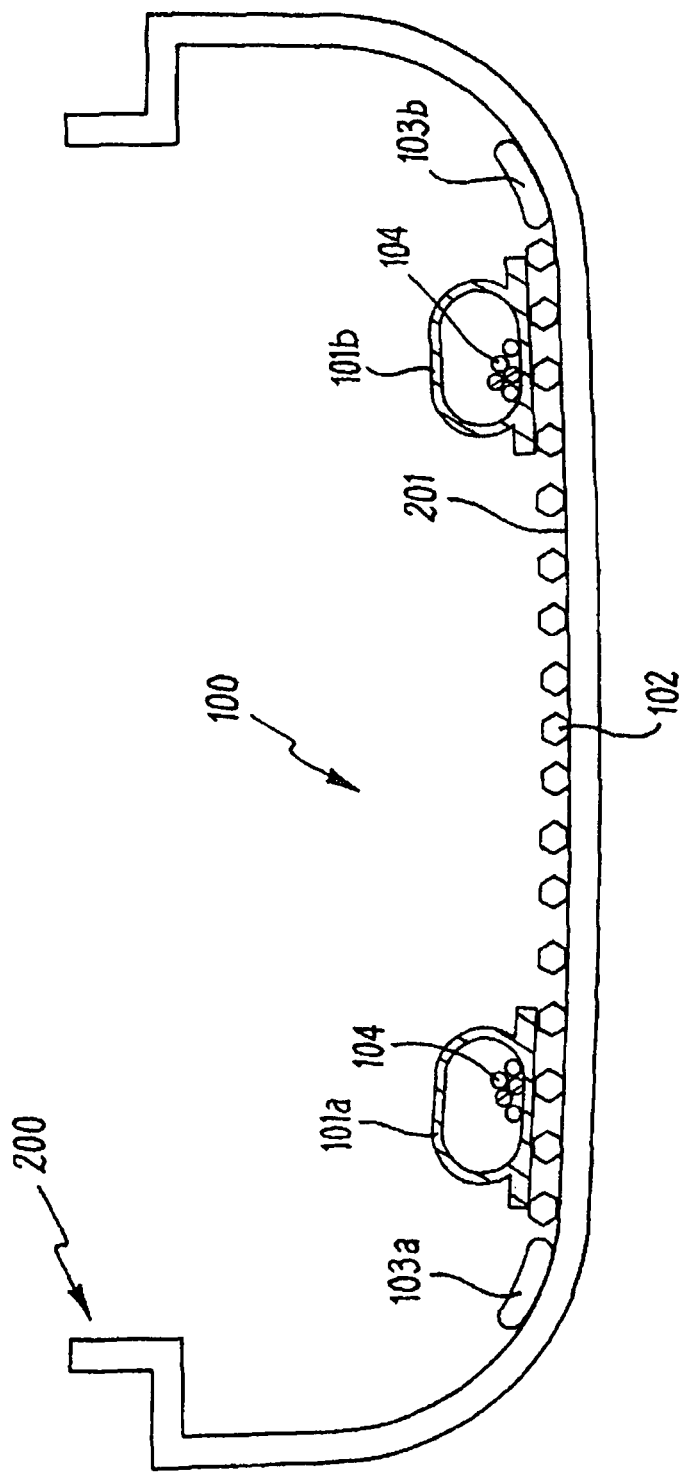
FIG. 1 is a cross-sectional view of part of tyre and a balancer.
Figure 2:
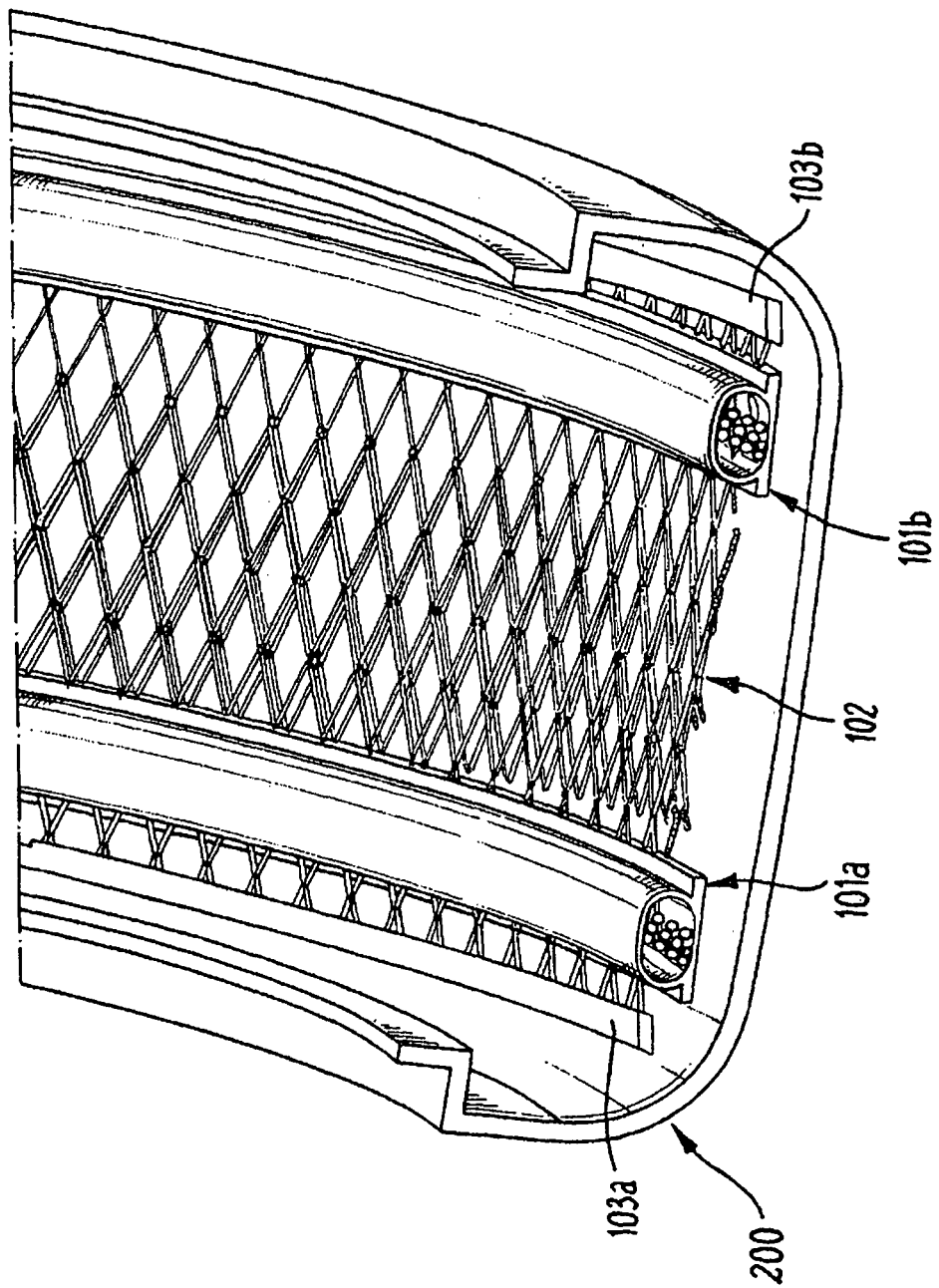
FIG. 2 is a perspective view of a section of the tyre and balancer of FIG. 1.

Referring to FIGS. 1 and 2, a balancer 100 for a wheel and pneumatic tyre assembly according to the present invention comprises: two annular tubes 101*a*, 101*b* mounted on a resiliently deformable support 102.

Each of the annular tubes 101*a*, 101*b* is partially filled with ball bearings 104. Each of the annular tubes 101*a*, 101*b* may also be partially filled with a fluid, in particular a liquid. Therefore each of the annular tubes 101*a*, 101*b* forms a mass that has some freedom to move about an axis of the assembly. The cross section of the annular tubes 101*a*, 101*b* may be of any suitable shape and preferably, the inner walls of the annular tubes 101*a*, 101*b* are smooth to allow the ball bearings and/or liquid to flow freely therein. In the illustrated embodiment the annular tubes have a generally oval cross-section with an extended outer flat surface on the radially outside edge.

The tubes are each formed from a plastics material and are resiliently deformable.

The resiliently deformable support 102 comprises a resiliently deformable mesh formed from a substantially solid plastics material. The mesh forms a generally cylindrical ring. Each of the free edges of the ring is joined to a ring formed from a strip of material 103*a*, 103*b*, such as a plastics material. Each of the strips of material 103*a*, 103*b* is also resiliently deformable. The outside circumferential surface of the ring may be concave so that only the edges of the ring will contact the inner circumferential wall 201 of a tyre 200 in which the ring is placed. This allows a central portion of the ring to remain clear of the inner circumferential wall 201 of the tyre 200. Advantageously, such a support 102 would not interfere with the operation of a liquid puncture repair that may be used to repair the tyre. In such embodiments, a central portion of the outside circumferential surface of the ring may be arranged so as to contact the inner circumferential wall 201 of the tyre 200 when the tyre 200 rotates under centrifugal forces. Advantageously, this provides for a more stable arrangement 100 when the tyre 200 rotates. Alternatively, as illustrated, the outside circumferential surface of the ring may conform to the inside circumferential surface of the tyre 200.

An outer dimension of the support 102, namely the outer radius of the ring, substantially matches an inner dimension of the tyre 200, namely the radius of the inner circumferential wall 201 of the tyre 200. As such, the support 102 is arranged to contact the inner circumferential wall 201 of a tyre 200. In addition, the width of the ring substantially matches the width of the circumferential wall of the tyre so that the rings 103*a*, 103*b* locate against the opposite sidewalls of the tyre. Thus the ring, and hence tubes, are located both radially and axially relative to the tyre.

The annular tubes 101a, 101b are mounted on the support 102 using any suitable mounting means. For example, the annular tubes 101a, 101b may be adhered, welded or clipped to the support 102. The tubes 101a, 101b are mounted on the support so that they extend substantially parallel to each other and are spaced apart from each other, each tube being located adjacent a respective axial edge of the ring support.

Such an arrangement 100 allows for simple, easy installation of the balancer as will now be described. The support 102 may be distorted by application of external forces in order to locate the balancer 100 inside the tyre 200. Once the balancer 100 is located inside the tyre and the external forces are removed, the support 102 will return to its original form and, since the support 102 has an outer dimension that substantially matches an inner dimension of the tyre 200, the balancer will be disposed proximate to the inner circumferential wall 201 of the tyre 200. This locates the two tubes 101a, 101b in chosen positions relative to the tyre 200. The tyre 200 can then be fitted to a wheel. The resiliency of the support and tubes enable them to accommodate flexing of the tyre when it is in motion.

Figure 3:
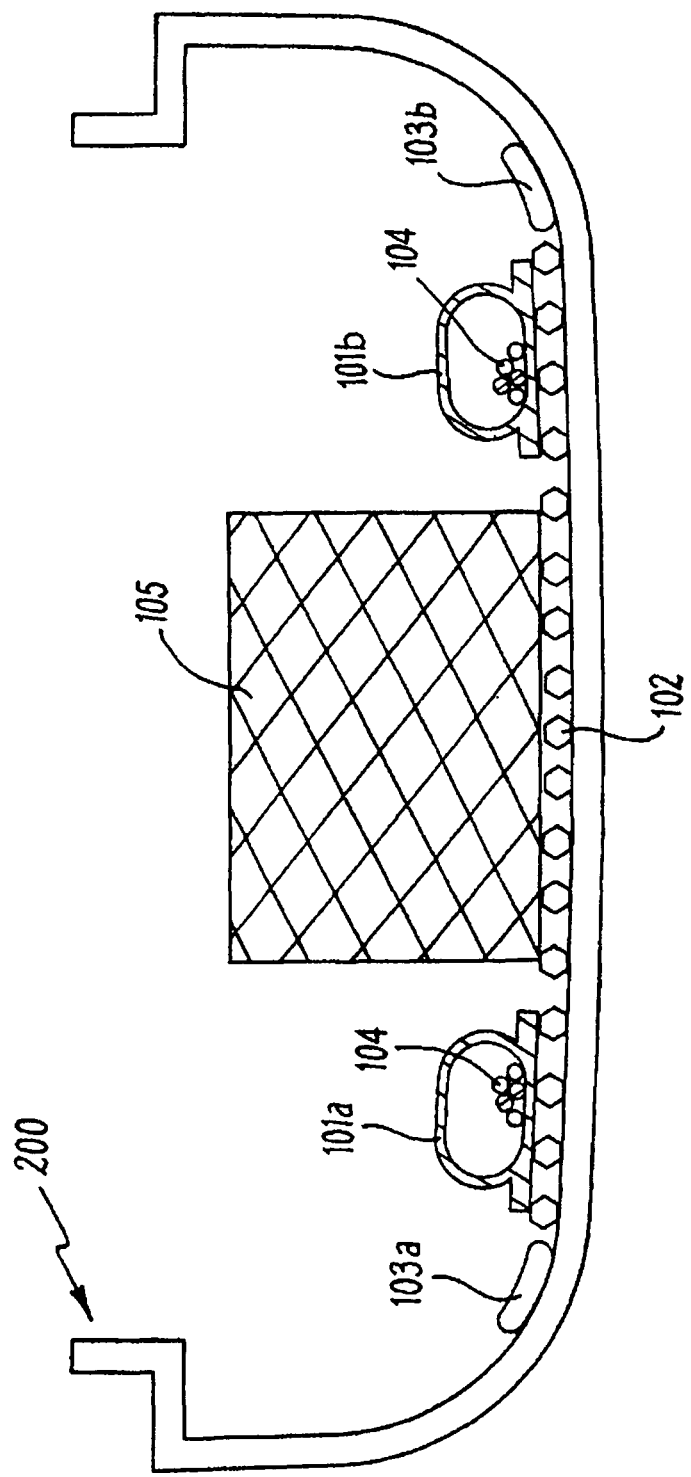
FIG. 3 is a cross-sectional view of part of tyre and a balancer incorporating a body of sound absorbing material.
Figure 4:
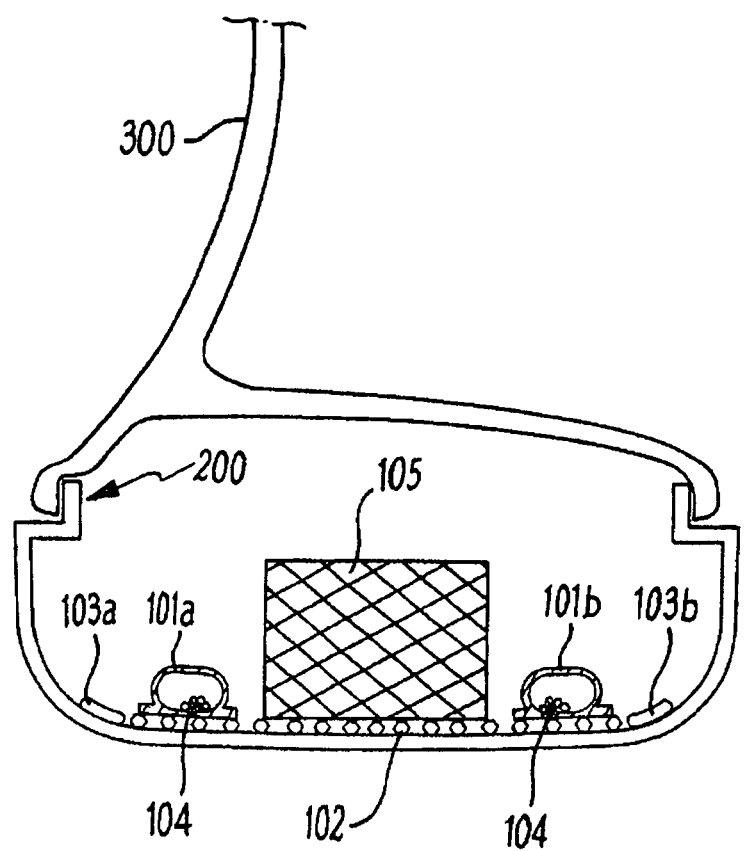
FIG. 4 is a partial, cross-sectional view of the tyre and balancer of FIG. 3 mounted to a wheel.

Turning now to FIGS. 3 and 4, the balancer 100 may further comprise a generally toroidal body of sound absorbing material 105. The body of material is formed from a resiliently flexible open celled foamed polypropylene material disposed in a stretchable fabric cover to contain any pieces of the foamed material which may break off. Other suitable materials could be used. The body has a substantially annular axial cross-section, and a substantially rectangular radial cross-section The body of sound absorbing material 105 is surrounded by and joined to the inside circumferential surface of the mesh of the support 102. The mesh could be embedded or partially embedded in the body of sound absorbing material 105. Alternatively (or additionally) the body of sound absorbing material 105 is bonded to the mesh with an adhesive.

The balancer 100, with or without sound absorbing material 105, is easily installed in a tyre 200 by flexing the balancer 100 and releasing it into the tyre 200. When released the support member locates between the sidewalls of the tyre 200 and thus locates the annular tubular masses 101a, 101b relative to the sidewalls so that the axes of the annular tubes 101a, 101b are substantially parallel to the axis of rotation of the tyre 200, and so that the two tubes 101a, 101b are spaced substantially equally from the centre line of the tyre 200. Subsequently the tyre 200 is fitted to a wheel 300. Since the balancer 100 and any sound absorbing material 105 is located towards the outer circumferential edge of the tyre 200, fitting the tyre 200 to a wheel, during which the tyre walls are forced towards each other as the tyre 200 passes over the rim of a wheel, does not interfere with the balancer 100 or any associated sound absorbing material 105.

In use, as the wheel rotates, the balancer 100 will rotate with the wheel. Liquid and/or bodies with the annular tubes 101a, 101b will be distributed within the wheel so as to correct any imbalance. Since the tubes 101a, 101b are located at substantially the radially outermost part of the inside of the tyre 200, mass moving within the tubes 101a, 101b has the greatest affect on the overall balance of the assembly. The balancer 100 could be used in place of any other means of balancing the tyre 200 and wheel assembly avoiding the need for fixed masses to be fastened to the wheel, allowing additional space for other components such as brakes within the wheel and avoiding the need for unsightly masses to be affixed to the outside of the wheel. In the event of uneven tyre wear, movement of the balancer 100 and any associated sound absorbing material 105 within the tyre 200 or movement of the tyre 200 relative to the wheel, all of which could affect the overall balance of the assembly, the fluid and/or bodies within the tubes will redistribute to re-balance the wheel.

The above embodiments are described by way of example only. Many variations are possible without departing from the scope of the invention as defined in the appended claims.

The invention claimed is:

1. A tyre assembly comprising:
   a tyre; and
   a balancer, the balancer comprising one or more tubes containing a movable mass, the or each tube being mounted to a resiliently deformable support,
   the deformable support comprising a resiliently deformable mesh having an outer dimension that substantially matches an inner dimension of the tyre, and arranged so that it may be deformed by application of suitable external forces to enable it to be located inside the tyre and so that, when said external forces are removed, the support positions and supports the or each tube within the tyre.

2. The tyre assembly as claimed in claim 1 wherein the/or each tube is annular.

3. The tyre assembly as claimed in claim 1 wherein the moveable mass comprises a fluid and/or a plurality of discrete solid masses.

4. The tyre assembly as claimed in claim 1 comprising two substantially parallel, spaced apart annular tubes extending around the entire circumference of the tyre assembly.

5. The tyre assembly as claimed in claim 4 wherein each one of said annular tubes lies proximate to a different inner side wall of the tyre.

6. The tyre assembly as claimed in claim 1 wherein the inner dimension of the tyre is the radius of the inner circumferential wall of the tyre.

7. The tyre assembly as claimed in claim 1 wherein the support is generally cylindrical and the outer dimension of the support is its outer radius.

8. The tyre assembly as claimed in claim 1 wherein the support is lies between the inner circumferential wall of the tyre and the/or each tube.

9. The tyre assembly as claimed in claim 1 wherein the support is formed from a substantially solid plastics material.

10. The tyre assembly as claimed in claim 1 wherein the/or each tube is formed separately from the support and is adhered, welded or clipped thereto.

11. The tyre assembly as claimed in claim 1 wherein the mesh is formed from a plastics material.

12. The tyre assembly as claimed in claim 1 wherein the mesh forms a ring and wherein each of the free edges of the mesh on opposite sides of the ring are joined to a respective ring formed from a strip of resiliently deformable plastics material.

13. The tyre assembly as claimed in claim 12 wherein the outside circumferential surface of the ring is concave.

14. The tyre assembly as claimed in claim 1 wherein the balancer comprises a body of sound absorbing material.

15. The tyre assembly as claimed in claim 14 wherein the body of sound absorbing material is resiliently flexible.

16. The tyre assembly as claimed in claim 14 wherein the body of sound absorbing material is generally annular in cross-section and is generally toroidal in shape.

17. The tyre assembly as claimed in claim 14 wherein the body of sound absorbing material expands to bear against the inside circumferential wall of the tyre under the action of centrifugal force, deforming or absorbing the support, when the tyre is rotated above a predetermined rate.

18. The tyre assembly as claimed in claim 1 wherein the support flexes under the action of centrifugal force so that a greater proportion of the support comes into contact with the tyre when the tyre is rotated above a predetermined rate.

19. The tyre assembly as claimed in claim 1 wherein the support locates the or/each tube both axially and radially within the tyre.

20. A tyre assembly comprising:
a tyre; and
a balancer, the balancer comprising one or more tubes containing a movable mass, the or each tube being mounted to a resiliently deformable support,
the deformable support having an outer dimension that substantially matches an inner dimension of the tyre, and arranged so that it may be deformed by application of suitable external forces to enable it to be located inside the tyre and so that, when said external forces are removed, the support positions and supports the or each tube within the tyre,
wherein the balancer comprises a body of sound absorbing material, and
wherein the body of sound absorbing material is made from a foamed plastics material.

21. A method of installing a balancer in a tyre comprising the steps of:
providing a tyre;
providing a balancer comprising one or more tubes containing a movable mass;
providing a resiliently deformable support with an outer dimension that substantially matches an inner dimension of the tyre;
mounting the or each tube on the resiliently deformable support;
deforming the support by application of suitable external forces so that it can be located inside the tyre;
locating the support and balancer inside the tyre; and
removing said forces to allow said support to position and support the or each tube within the tyre.

* * * * *